Aug. 4, 1942.  H. F. OLSON  2,292,153
AIRCRAFT GROUND SPEED INDICATOR
Filed June 22, 1939
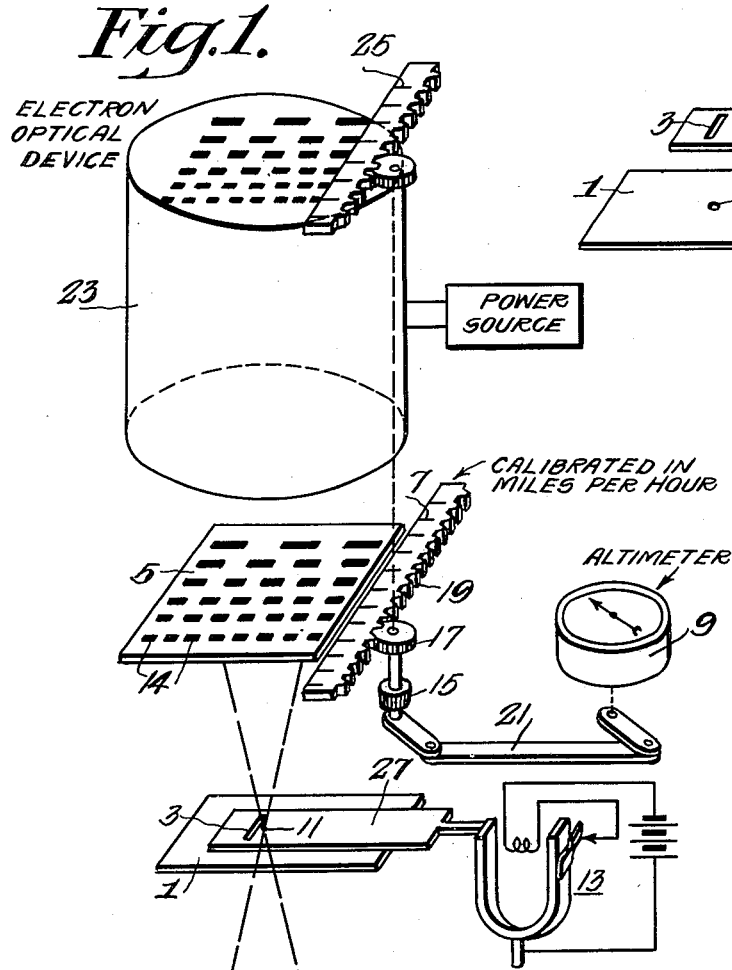
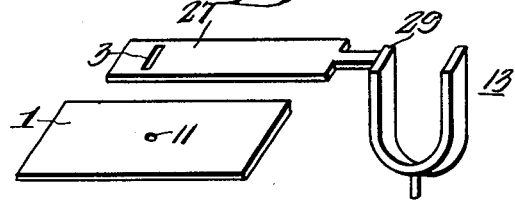
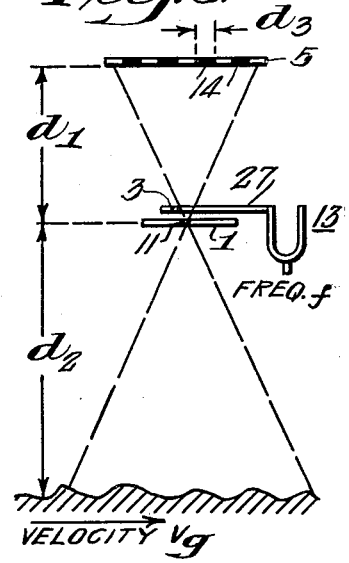
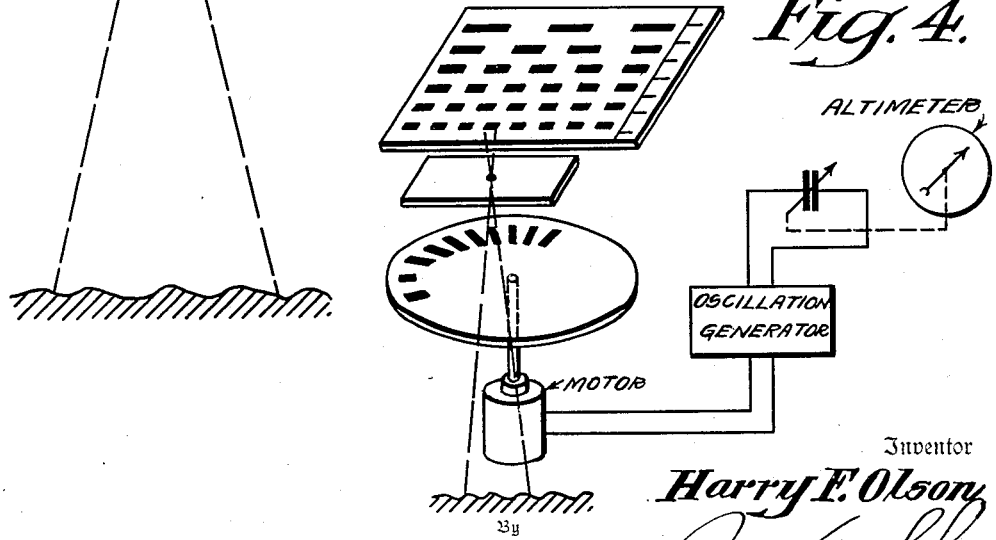
Inventor
Harry F. Olson
By
Attorney Patented Aug. 4, 1942

2,292,153

UNITED STATES PATENT OFFICE 2,292,153

AIRCRAFT GROUND SPEED INDICATOR

Harry F. Olson, Haddon Heights, N. J., assignor to Radio Corporation of America, a corporation of Delaware Application June 22, 1939, Serial No. 280,555

8 Claims. (Cl. 33—46.5)

This invention relates to aircraft ground speed indicators and more particularly to direct reading indicators for day or night operation.

Aircraft velocities have been indicated on the craft by two methods; one measures the velocity of the craft through the air; the other indicates the ground as an optical image whose velocity, between points on an optical screen, is used as a basis for calculating the ground speed. The former method indicates velocities which are independent of the ground; the latter method is cumbersome and not well suited to night operation.

The present invention has for one of its objects the provision of means for indicating directly the ground speed of an aircraft. Another object is to provide means for indicating the ground speed of an aircraft during periods of low visibility. Another object is to provide means for indicating the ground speed of aircraft during night operation.

The invention will be described by referring to the accompanying drawing in which Figure 1 is a perspective view representing one embodiment of the invention; Figure 2 is a perspective view of the vibrating slit and pin hole device used in the invention; Figure 3 is a graphic illustration describing the invention; and Figure 4 is a schematic illustration of a modification of the invention. Similar reference numerals will be used to indicate similar elements in the several figures.

Referring to Fig. 1, an apertured shield 1, a vibrating light slit 3, an optical screen 5, a scale 7 and altimeter 9 are suitably mounted on an aircraft, which is not shown. The shield 1 includes a pin hole aperture 11. The vibrating light slit 3 is fastened to a tuning fork vibrator 13, which is arranged to operate at a constant frequency as hereinafter described. A number of opaque markers 14 are arranged on the screen 5, which is preferably of the ground glass type used in cameras and the like. The markers 14 of each row are separated by uniform spacers which are preferably equal in lengths to the markers. Each row of the several rows contains markers and spacers of different lengths. By way of example, the rows include eight, seven, six, five, etc. markers which are chosen as described below. The scale 7 is arranged along side of the screen 5. The scale, which may be calibrated in miles per hour or other suitable units, may be moved by means of a knob 15, suitably connected through a pinion gear 17 and a rack 19, or by means of a link connection 21 to the altimeter 9.

For night operation, an electron optical device 23, of the type described in the copending application Serial No. 52,289, filed November 20, 1935, by George A. Morton for "Electro-optical devices" patented February 6, 1940, Patent No. 2,189,319, is arranged adjacent the screen 5. The scale 7, or a duplicate 25 thereof is arranged near the electronic screen of the electron optical device. The duplicate scale 25 is operated by the altimeter 9 or by a manual control.

The details of the vibrating slit and the apertured shield are shown in Fig. 3. The pin hole focuses an image of the ground on the ground glass screen 5. The slit 3 is arranged in a small light weight shield 27 which is suitably secured to one of the tines 29 of the tuning fork. The slit is positioned with respect to the aperture so that each cycle of the fork will uncover and cover the aperture. The fork is maintained, preferably, at constant temperature, or temperature compensated materials are used, so that the frequency will be constant.

The mode of operation of the indicator will be described by referring to Fig. 3. If the craft carrying the device is moving with respect to the ground, and if the fork 13 is vibrating at a constant frequency, there will be some velocity at which the image of the ground will appear to stand still on the spacers in one of the rows on the ground glass screen 5. The frequency at which the image appears stationary is the frequency at which the fork and the image repetition rate (due to the markers 14 and spacers) is synchronized. Since this indication will vary with altitude, it is necessary to select the row of markers and spacers as a function of altitude, although it may be accomplished by making the shutter revolve at a rate determined by the altitude.

In the event that the constant frequency mode of operation is used, the frequency is determined as follows: The speed of the image on the screen will be $$V_i = \frac{d1}{d2} V_g$$

where $d1$=distance from the screen to the shutter-aperture, $d2$=distance from the shutter-aperture to ground, and $V_g$ represents the ground speed. If $d3$=distance between markers, and the distance travelled by the image on the screen in time $t$ equals $$\frac{d1}{d2} V_g t$$

then the tuning fork or aperture-shutter frequency $$f = \frac{\frac{d1}{d2} V_g}{d3}$$

It should be understood that the distances $d1$ and $d3$ and the frequency $f$ may be fixed in accordance with the average ground speed to be measured. The distance $d2$ is determined by the altimeter. Therefore the unknown ground speed $V_g$ may be indicated. By employing a plurality of rows of markers and spacers, a range of velocities is covered. The row indicating the ground speed is the one in which the image appears stationary; the rows in which the image is blurred are ignored. The velocity is indicated on the adjoining scale at the point opposite the row of spaces within the ground image appears to be stationary which is either manually or automatically adjusted to compensate for altitude or changes in altitude.

By way of example a ground speed indicator according to the invention may be designed as follows: assume that the instrument is being used on an aircraft flying at 1000 feet altitude ($d2=1000$) and that the average ground speeds will be about 200 feet per second ($V_g=200$). Let $d1$ be made 1 foot and $d3$ be made .01 foot. Then the shutter frequency in cycles per second may be determined as follows:

$$f = \frac{\frac{d1}{d2} V_g}{d3} = \frac{\frac{1}{1000} 200}{.01} = \frac{.2}{.01} = 20 \text{ cps}$$

Having determined the shutter frequency and the distance between the markers for one row, the distance between the markers for other rows can be determined. The number of such rows, containing different marker spacing, will be determined by the exactness and range of ground speeds to be indicated.

When the device is used at night, or during low visibility, the electron image tube is used because then the image of the ground may be based on infra red radiation instead of visible light. The electron image tube converts the invisible infra red image into a visible image. The markers, spacer and scale rows are duplicated on the screen of the electron tube. In the electron image tube modification, it should be understood that the ground glass screen and its associated scale, which are used for visible light, may be omitted.

Thus the invention has been described as an aircraft ground speed indicator. The image of the ground is interrupted at a known frequency. The image is focused on a screen which is composed of rows of alternately transparent and opaque spacers and markers. When the frequency of interruption and the frequency of the image on the spacers are the same, the image will appear stationary on one of the rows, and the velocity may be determined directly by means of an altitude correction device which carries a scale calibrated in miles per hour. While the focusing device has been described as a pin hole, it should be understood that a lens system may be used. Likewise, while a tuning fork interrupter has been disclosed, a rotating disc driven by a synchronized motor may be used. In the latter case, the motor speed may be controlled by an oscillator whose frequency is a function of the altimeter indication as shown in Fig. 4, or the motor speed may be maintained constant and the scale corrected as shown in Fig. 3.

Although my device has been described above as applied to an airplane for use in determining ground speed, it will be apparent to those skilled in the art that it may likewise be used on the ground and an airplane at a known altitude may be observed through the apparatus. The altitude may be indicated by any of the usual altimeters used to determine the altitude of an aircraft under such circumstances. The apparatus may be used in a similar manner to determine the relative velocities between any two relatively linearly moving objects between which the distance is determinable.

I claim as my invention:

1. An aircraft ground speed indicator including an optical screen, said screen including rows of opaque markers and transparent spacers, means for focusing an image of the ground on said screen, means for interrupting said image at a constant frequency to form a row of stroboscopic images on said spacers, an altimeter, and means for indicating the ground speed of said craft as functions of its altitude and said interrupted image.

2. An aircraft ground speed indicator including in combination, a screen including opaque markers and transparent spacers, means for focusing an image of the ground on said screen, means for interrupting said image at a constant frequency to form a row of stroboscopic images on said spacers, an altimeter carrying a correction scale, and means for indicating the ground speed on said scale by relating thereto said interrupted image.

3. An aircraft ground speed indicator including an optical screen composed of rows of different numbers of alternately opaque and transparent sections, means for focusing an image of the ground on said screen, means for interrupting said image at a rate which is synchronized with the movement of said image along one of said rows to form thereby stroboscopic images on said one row, an altimeter, and a scale located near said screen and operated by said altimeter as a function of the altitude of said craft, whereby the row in which said image appears stationary indicates the ground speed on said scale.

4. An aircraft ground speed indicator including an optical screen composed of rows of different numbers of alternately opaque and transparent sections, said sections having different lengths in different rows, means for focusing an image of the ground on said screen, means for interrupting said image at a constant rate which is synchronized with the movement of said image along one of said rows to form thereby a stroboscopic image on each of the transparent sections of said one row, an altimeter and a scale located near said screen and operated by said altimeter as a function of the altitude of said craft, whereby the row in which said image appears stationary indicates the ground speed on said scale.

5. An aircraft ground speed indicator including in combination, a screen including opaque markers and transparent spacers, means for focusing an image on the ground on said screen, an altimeter, a generator including a connection to said altimeter, said generator having a frequency dependent upon said altimeter indication, a synchronous motor connected to said generator, and means operated by said motor to interrupt said image whereby the portion of the image which appears stationary on said screen indicates the ground speed.

6. A device of the character of claim 1 in which said means for interrupting includes a light slit, and a vibrating tuning fork.

7. A device of the character of claim 1 in which the focusing means includes an aperture and the interrupting means is a vibratable light slit.

8. A relative speed indicator including an optical screen having rows of different numbers of alternately opaque and transparent sections, means for focusing an image of the object of which the speed relative to the measuring device is to be determined on said screen, means for interrupting said image at a constant frequency to form a row of stroboscopic images on said transparent sections, means for indicating the distance between the measuring device and the object, and means for indicating the relative speed of said object and indicator as functions of the distance and the said interrupted image.

HARRY F. OLSON.